United States Patent

Maeda et al.

Patent Number: 5,872,643
Date of Patent: *Feb. 16, 1999

[54] FILM IMAGE REPRODUCING APPARATUS USING A DOMESTIC LIGHT CONDITION OR AN UNDOMESTIC LIGHT CONDITION FOR GENERATION OF A DESIGNATED AREA

[75] Inventors: Yukari Maeda, Osaka; Toshiyuki Tanaka, Amagasaki; Hiroshi Ootsuka, Toyokawa, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 421,504

[22] Filed: Apr. 13, 1995

[30] Foreign Application Priority Data

Apr. 15, 1994 [JP] Japan ................................ 6-77504

[51] Int. Cl.$^6$ .................. G03F 3/08; H04N 1/46
[52] U.S. Cl. .................. 358/518; 358/506; 358/520; 358/487
[58] Field of Search .................. 358/518, 487, 358/527, 501, 524, 515, 506, 509, 519, 525, 523, 520, 538, 537, 505, 453; 354/106, 202

[56] References Cited

U.S. PATENT DOCUMENTS

| | | | |
|---|---|---|---|
| 4,506,300 | 3/1985 | Fearnside | 348/100 |
| 4,780,735 | 10/1988 | Taniguchi et al. | 354/202 |
| 5,151,726 | 9/1992 | Iwashita et al. | 354/106 |
| 5,218,392 | 6/1993 | Sakamoto et al. | 354/106 |
| 5,365,290 | 11/1994 | Suzuki et al. | 354/106 |
| 5,420,699 | 5/1995 | Yamanouchi et al. | 358/487 |
| 5,461,439 | 10/1995 | Minakuti et al. | 354/106 |
| 5,461,440 | 10/1995 | Toyoda et al. | 354/106 |

*Primary Examiner*—Edward L. Coles, Sr.
*Assistant Examiner*—Fan Lee
*Attorney, Agent, or Firm*—Burns, Doane, Swecker & Mathis, LLP

[57] ABSTRACT

A film image reproducing apparatus includes an image pick-up device which picks up a film frame image recorded on a film to generate image data; an information reader which reads information about photographing conditions of the film frame image; a reproducing area designator which designates a reproducing area of the film frame image; a measuring device which measures a domestic light condition having to do with the designated reproducing area when the film frame image is picked up; a correcting device which corrects image data corresponding to the designated reproducing area using either the domestic light condition of the designated reproducing area or an undomestic light condition not having to do with the designated reproducing area; and a judging device which judges based on the information which is proper to use for image data correction, the domestic light condition or the undomestic light condition.

19 Claims, 9 Drawing Sheets

FILM IMAGE REPRODUCING APPARATUS USING A DOMESTIC LIGHT CONDITION OR AN UNDOMESTIC LIGHT CONDITION FOR GENERATION OF A DESIGNATED AREA

BACKGROUND OF THE INVENTION

This invention relates to a film image reproducing apparatus for picking up and reproducing a light image representing a film image and, particularly to an apparatus capable of enlarging and reproducing a part of a film frame image.

There has been known film video players or apparatus for reproducing on a monitor a film image recorded on a photographic film. The reproducing apparatus of this type is such that: light is projected to a film to form a light image representing a film image; this light image is reproduced, i.e., displayed on a monitor or printed after being sensed by a photoelectric conversion element to be converted into an electrical signal. In reproducing the film image, it is not always necessary to reproduce the entire film frame image. Sometimes, an operator wishes to enlarge a part of the film frame image and to display the enlarged part of the film frame image. In view of this, there has been proposed a reproducing apparatus provided with a zooming function.

U.S. Pat. No. 4,506,300 discloses a film video player in which light is projected to a film from one direction, and the film image is picked up by way of a zoom lens while controlling the amount of light to be projected by the use of a light attenuation disk. Also, U.S. Pat. No. 4,780,735 discloses printing of film image in which a specified zooming is applied to a light image representing a film frame image, and a zoomed image is printed after correcting the exposure and the white balance thereof.

The picture taking is normally performed under the photographing conditions set on the basis of a main subject. Accordingly, there are cases where a part of a film frame image, e.g., a background image, may be reproduced differently from the main subject image. In other words, this part of the film frame image cannot be reproduced with proper brightness and colors.

In the aforementioned film video player, a zoomed part of a film frame image is also picked up under a specified exposure condition. The exposure and the white balance are not corrected under conditions suitable for the zoomed images. Thus, there is a likelihood that the zoomed image cannot be suitably reproduced depending upon the reproduction area.

In the aforementioned film frame image printing, the exposure and the white balance are corrected for a zoomed image. However, in reproducing a zoomed image, there may be the demand of reproducing the zoomed image under the same reproduction conditions for the film frame image, not under the reproduction conditions suitable for the zoomed image. However, U.S. Pat. No. 4,780,735 does not disclose a printing or reproducing way which can satisfy such demand.

SUMMARY OF THE INVENTION

It is an object of the present invention to provide a film image reproducing apparatus which has overcome the problems residing in the prior art.

It is another object of the present invention to provide a film image reproducing apparatus which can judge which is better to perform exposure correction and white balance correction at control values for reproduction of the film frame image or at control values for reproduction of the zoomed image.

The present invention is directed to a film image reproducing apparatus comprising: an image pick-up device which picks up a film frame image recorded on a film to generate image data; an information reader which reads information about photographing conditions of the film frame image; a reproducing area designator which designates a reproducing area of the film frame image; a measuring device which measures a domestic light condition having to do with the designated reproducing area when the film frame image is picked up; a correcting device which corrects image data corresponding to the designated reproducing area using either the domestic light condition of the designated reproducing area or an undomestic light condition not having to do with the designated reproducing area; and a judging device which judges based on the information which is proper to use for image data correction, the domestic light condition or the undomestic light condition.

The information may be recorded on the film on which the film frame image is recorded. It may be preferable to further render the measuring device measure a general light condition of a whole area of the film frame image as the undomestic light condition. Also, it may be preferable to render the information have least one of a brightness of a subject, a position of a main subject, and a light source. Further, it may be appreciated to render the measuring device measure a light condition based on the generated image data.

The measuring device may be made to measure a light amount at the designated reproducing area as the light condition. The correcting device may correct image data in aspect of brightness of the designated reproducing area.

The measuring device may be made to measure a color level at the designated reproducing area as the light condition. The correcting device may correct image data in aspect of color of the designated reproducing area.

Furthermore, the measuring device may be made to measure a light amount and a color level at the designated reproducing area as the light condition. The correcting device may correct image data in aspect of brightness and color of the designated reproducing area.

The film image reproducing apparatus is provided with the judging device judges based on the photographing condition information which of the measured domestic and undomestic light conditions is proper to correct the image data. The correcting device corrects the image data corresponding to the designated reproducing area using a judged suitable light condition. Accordingly, this will assure an optimum reproduction of a zoomed portion of the film frame image.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
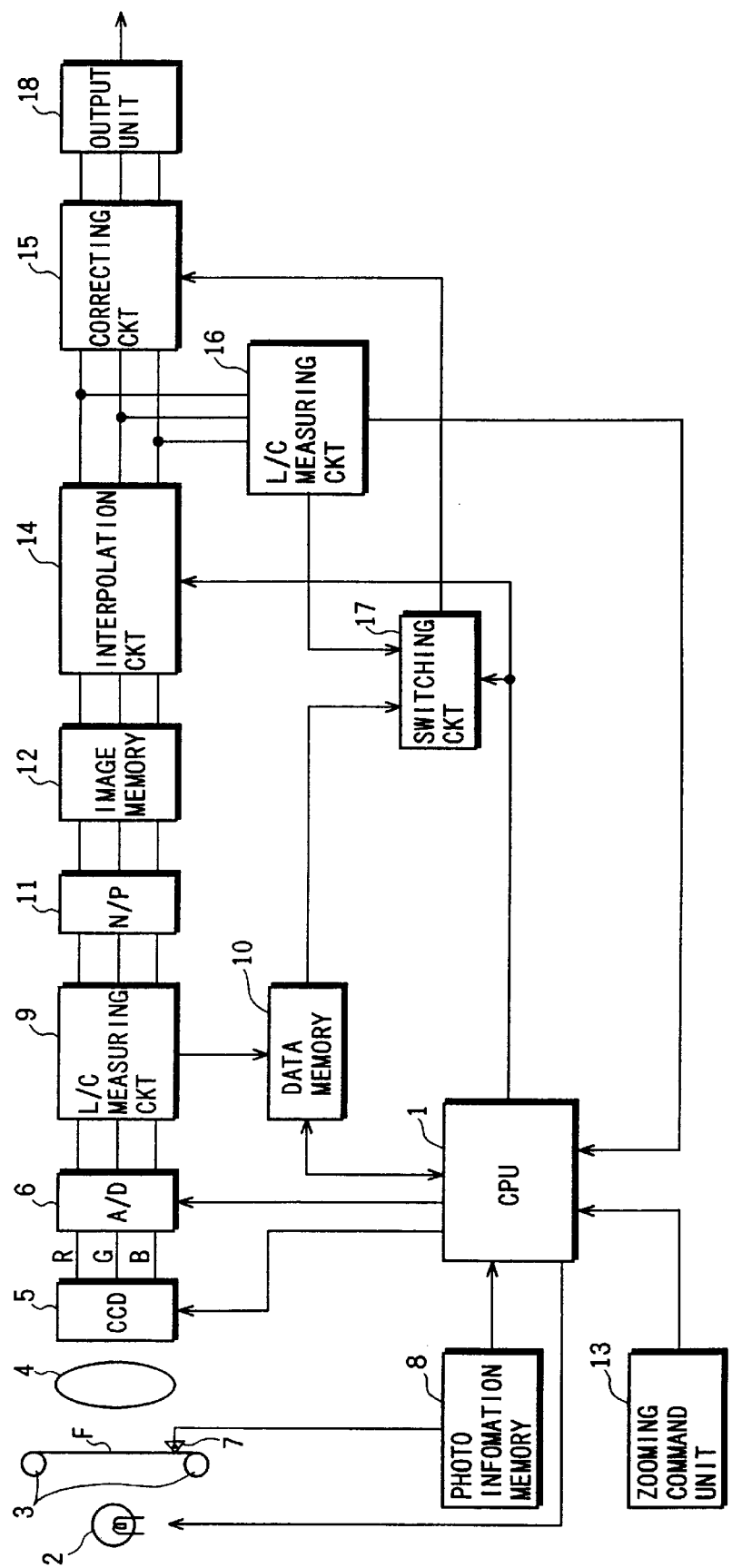
FIG. 1 is a circuit block diagram showing a film image reproducing apparatus according to the invention.

FIG. 1 is a circuit block diagram showing a film image reproducing apparatus according to the invention.

Indicated at 1 is a microcomputer (hereinafter referred to as CPU) for centrally controlling operations of the apparatus. The CPU 1 implements a variety of operations in accordance with a built-in program, outputs the operation results to specified circuits, and outputs specified control signals to the specified circuits.

Indicated at 2 is a light source for emitting a light to a film frame image recorded in each frame of a film F from a direction normal to the surface of the film F. Indicated at 3 are a rewind roller (may be a rotatable shaft in an unillustrated film cartridge) and a take-up roller which are spaced apart in parallel relationship by at least one frame of the film F. These rollers 3 are driven by unillustrated driving source and driving mechanism. The film F is wound or rewound frame by frame into and from the film cartridge loaded in a suitable position in the apparatus.

A lens 4 is adapted to focus a light image obtained through the film F onto a receiving surface of an image pick-up device 5 disposed in a suitable position therebehind. The image pick-up device 5 is an area sensor including a color CCD image sensor of single plate type in which photoelectric conversion elements such as photodiodes are arrayed in a two-dimensional matrix and color filters of R, G, B are arrayed in a checkered pattern on the sensing surfaces of the respective elements. The image pick-up device 5 receives the light image representing the film frame image which is focused on the sensing surface for a predetermined time, and picks up the image by converting the received light energy into an electrical signal corresponding to an amount of received light (hereinafter referred to as image signal). Pixel signals obtained by the respective elements of the image pick-up device 5 are separated into color image signals of R, G, B. After being scanned in a raster scanning direction, these color signals are sequentially sent to an analog-to-digital converter 6. Instead of the area sensor, the image pick-up device 5 may be a linear sensor capable of scanning at a constant speed in a subscanning direction.

The converter 6 converts the respective analog color image signals into digital image data. The converter 6 performs sampling in accordance with a sampling pulse from the CPU 1 which corresponds to the scanning speed, and a quantization.

In the film F, there is formed a longitudinally extending strip-like magnetic recording portion, for example, at either an upper or lower side of each frame. For each photographing operation, photographing information such as a brightness of a subject, a magnification, a position of a main subject, and a light source (ambient light, the use of flash light, fluorescent light) are written on these magnetic recording portions in correspondence with the respective frames by a magnetic writing device provided in a camera. For example, the photographing information are written in corresponding positions.

A value obtained by dividing a focal length of the lens at the time of photographing by a photographing distance is written as a magnification.

The position of the main subject is, for example, determined as follows. The camera normally has a function of executing automatic focusing (AF) and has a plurality of AF areas which are arranged in H-shape of a specified size in an angle of view. During the photographing operation, the distance metering is performed for the objects located in the respective AF areas. If a shortest distance data is used as an AF data, the AF area where this distance metering data was obtained is selected as the position of the main object. The selected AF area data is written on the magnetic recording portion of the film F by the magnetic writing device.

The data concerning the light source including whether the photographing was conducted with the assist of flash light, under the ambient light, or under the fluorescent light may be written during the photographing operation or before the reproduction.

The photographing information recorded on the magnetic recording portion of the film F are read by a magnetic head 7 which is opposed to the recording portion after the film cartridge is mounted in the reproducing apparatus. The read information are stored in a photographing information memory 8.

Instead of the magnetic writing device, as disclosed in U.S. Pat. No. 4,780,735, an optical code imprinting unit may be employed which includes optical fibers so arranged in an array as to face an emulsion surface of a film and light emitting diodes disposed at base ends of the optical fibers. In this case, instead of the magnetic head 7, an optical device such as a photosensor may be arranged such that it is capable of reading the imprinted codes. As photographing information reading means, the magnetic head 7 may be used in the case of the magnetic recording and the photosensor may be used in the case of the optical recording.

Figure 2:
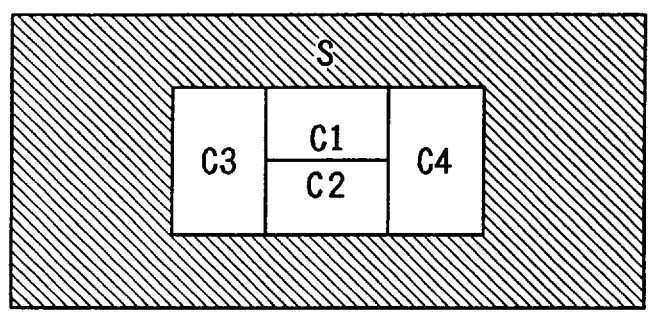
FIG. 2 is a diagram showing light metering areas and color metering areas consisting of central areas C1 to C4 and a peripheral area S.

A light/color measuring circuit 9 performs light measurement (AE) of a light amount and color measurement (AWB) of color level for each of the areas C1 to C4, and S shown in FIG. 2 in accordance with the image data from the A/D converter 6, and calculates an average light measurement value (AEstd) and an average color measurement value (AWBstd) based on these data.

An exemplary calculating method will be described. In FIG. 2, there are four central areas C1 to C4 and one peripheral area S. C1ae to C4ae, Sae denote light measurement values and C1awb to C4awb, Sawb denote color measurement values in the respective areas. The areas C1 to C4 correspond to the aforementioned AF areas. In this case, the area S may be considered to correspond to a case where the data concerning the object distance are averaged. Regardless of the AF areas, for example, after the photographing operation, the position of the main subject may be selected from the areas C1 to C4 and S and manually recorded on the magnetic recording portion of the film F.

Equations used for the above calculation differ depending upon a photographic scene. Following is three examples. It is assumed that the relationship of coefficients K1, K2, K3 is: K1>K2>K3.

(EXAMPLE 1)

Case where a person(s) is/are to be photographed against the sun at a magnification greater than the one used when photographing an upper body of a person (a main subject (person) is assumed to fall within the area C4)

$$AEstd = \frac{K1 \cdot C4ae + K2 \cdot (C1ae + C2ae) + K3 \cdot C3ae + Sae}{K1 + 2 \cdot K2 + K3 + 1} \quad (1)$$

$$AWBstd = \frac{K1 \cdot C4awb + K2 \cdot (C1awb + C2awb) + K3 \cdot C3awb + Sawb}{K1 + 2 \cdot K2 + K3 + 1} \quad (2)$$

(EXAMPLE 2)

Case where a person(s) is/are to be photographed against the sun at a magnification smaller than the one used when photographing an upper body of a person (a main subject (person) is assumed to fall within the area C4)

$$AEstd = \frac{K1 \cdot C4ae + K2 \cdot (C1ae + C2ae + C3ae) + Sae}{K1 + 3 \cdot K2 + 1} \quad (3)$$

$$AWBstd = \frac{K1 \cdot C4awb + K2 \cdot (C1awb + C2awb + C3awb) + Sawb}{K1 + 3 \cdot K2 + 1} \quad (4)$$

(EXAMPLE 3)

Case where a person(s) or a landscape is to be photographed not against the sun $$AEstd = \frac{K1 \cdot \sum_{i=1}^{4} Ci + Sae}{4 \cdot K1 + 1} \quad (5)$$

$$AWBstd = \frac{K1 \cdot \sum_{i=1}^{4} Ci + Sawb}{4 \cdot K1 + 1} \quad (6)$$

In this way, the light measurement value (AEstd) and the color measurement value (AWBstd) are calculated in accordance with Equations (1), (2) or (3), (4) or (5), (6) used for the corresponding photographic scene, and the calculated values are stored in a data memory 10.

A negative-to-positive (N/P) inverting circuit 11 applies an N/P inversion and a white balance correction to the image data in accordance with the calculated light measurement value (AEstd) and the color measurement value (AWBstd). The N/P inversion is applied only in the case where the film F is a negative film. An image memory 12 stores the image data which was converted into a positive image in the N/P inverting circuit 11. The memory 12 has a storage capacity of one frame or a specified number of frames.

Figure 3:
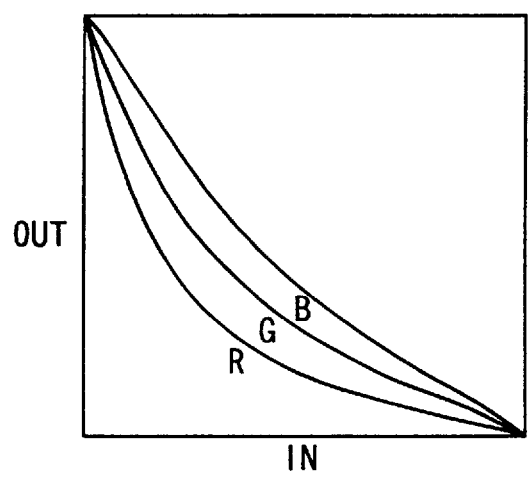
FIG. 3 is a graph showing conversion curves of the respective colors of red (R), green (G), blue (B) which are used for the negative-to-positive inversion and the white balance correction.

The N/P inversion and the white balance correction performed in the N/P inverting circuit 11 are preset. For example, they are performed in accordance with curves of the respective colors of R, G, B shown in FIG. 3. In this graph, horizontal and vertical axes represent input and output levels of each color data constituting the image data, respectively.

Figure 4:
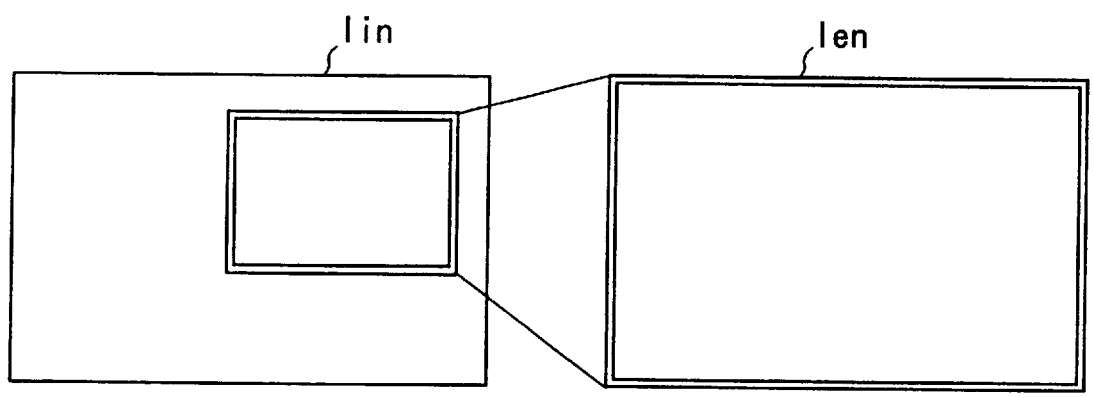
FIG. 4 is a diagram showing a relationship between a picked up film frame image and an enlarged image.

A zooming command unit 13 which acts as a reproducing area designation means includes a zoom data input unit capable of designating a center position of zooming and a zooming ratio. The CPU 1 reads the input zoom data and calculates, based on the zoom data, a center address and an address of an image area to be zoomed and reproduced out of the image data stored in the image memory 12. FIG. 4 is a diagram showing a relationship between a picked up image Iin and an enlarged image Ien. Since a data interpolation corresponding to a zooming ratio is applied to the image to be reproduced, the CPU 1 determines the range of the image area to be reproduced in consideration of the data interpolation, i.e., the zooming ratio.

An interpolation circuit 14 applies an interpolation to the image data from the image memory 12 so as to obtain an enlarged image. The interpolation is such that a part of the image is extracted and a pixel data is generated from a data of a certain pixel and data of pixels neighboring this certain pixel, using the extracted image data.

Figure 5:
FIG. 5 is a diagram linearly showing an example of interpolation or linear interpolation.
Figure 5:
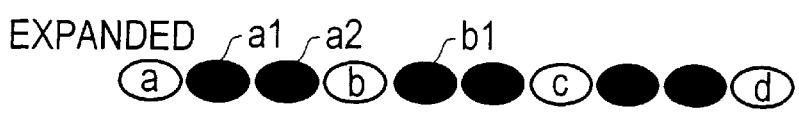
Figure 5:
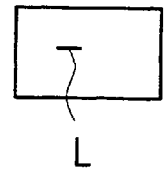

FIG. 5 is a diagram linearly showing an example of the interpolation, that is, a linear interpolation. Let it be assumed that a, b, c, d, . . . denote pixels of one row L of an image data and that the image is expanded three-fold. In FIG. 5, two interpolation pixels a1, a2 are generated between the pixels a and b as indicated by black circles. For the sake of convenience, Va, Vb, . . . denote data of the pixels a, b, . . . . An interpolation data Va1 is expressed as (2×Va+Vb)/3 and an interpolation data Va2 is expressed as (Va+2×Vb)/3. Likewise, two interpolation pixels are generated between the pixels b and c. For example, an interpolation data Vb1 is expressed as (2×Vb+Vc).

Figure 6:
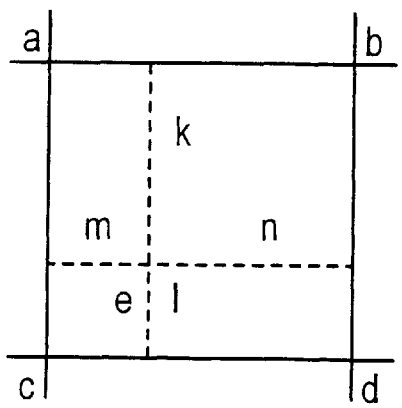
FIG. 6 is a diagram showing a case where the interpolation is two-dimensionally applied in accordance with the technique of FIG. 5.

FIG. 6 is a diagram showing a case where the interpolation is two-dimensionally applied in accordance with the technique of FIG. 5. As shown in FIG. 6, this interpolation is applied every (k+l) pixels in the row direction and every (m+n) pixels in the column direction. For example, the interpolation pixels are generated between the pixels a, b, c and d which neighbor one another in the image memory 12.

Now, there is considered a case where a data Ve of an arbitrary interpolation pixel e which is located in an area enclosed by the pixels a, b, c, and d. In this case, the data of the interpolation pixel is influenced in both the row and column directions. Thus, this data is calculated so as to have both row and column direction components (Vec, Vel). A final interpolation pixel data Ve is determined by combining the column vector and the row vector, etc.

The calculation of the row direction component is started from obtaining pixel data Veup and Vedn where the pixel e intersects with rows (a–b), (c–d) above and below the pixel e, respectively. The pixel data interpolated at the positions where the pixel e intersects with these rows are not subject to the pixel data of another rows. For example, the interpolation pixel data on the row (a–b) are not subject to the data Vc and Vd.

The data Veup at the intersection of the pixel e and the row (a–b) is expressed as (n×Va+m×Vb)/(m+n). Likewise, the data Vedn at the intersection of the pixel e and the row (c–d) is expressed as (n×Vc+m×Vd)/(m+n) Accordingly, $$Vec=(1\times Veup+k\times Vedn)/(k+1) \quad (7)$$

Hence, $$Vec=\{1\times(n\times Va+m\times Vb)+k\times(n\times Vc+m\times Vd)\}/(k+1)\times(m+n) \quad (8)$$

Likewise, the row direction component is expressed as follows.

$$Vel=\{m\times(k\times Vd+1\times Vb)+n\times(k\times Vc+1\times Va)\}/(k+1)\times(m+n) \quad (9)$$

The pixel data Ve at each interpolation position is obtained in accordance with Equations (8) and (9) and is transferred to a luminance/color correcting circuit 15.

The CPU 1 also functions as a judgment means for judging whether the data (AEzoom, AWBzoom) calculated for the enlarged image should be used instead of the data (AEstd, AWBstd) calculated for the picked up image. The CPU 1 performs this judgment in accordance with a flowchart shown in FIG. 12.

TABLE-1 shows a case where it is preferable to correct the luminance and the color of the enlarged image.

Further, the color measurement value AWBzoom is obtained in the form of a ratio of complete average values of R, G, and B.

The data (AEstd, AWBstd) calculated in the light/color measuring circuit 9 and the data (AEzoom, AWBzoom) calculated in the light/color measuring circuit 16 are fed to a switching circuit 17, which feeds the data selected in accordance with the judgment result to the luminance/color correcting circuit 15. If the judgment result indicates that no change is necessary, the data (AEstd, AWBstd) obtained for the main subject image are fed to the circuit 15 in which the luminance correction and the color correction are applied in accordance with these data. On the other hand, if the judgment result indicates that a change is necessary, the data (AEzoom, AWBzoom) obtained for the enlarged image are fed to the circuit 15 in which the luminance correction and

TABLE 1

| ZOOM AREA | RESULT OF NORMALIZATION | PROCESS DURING THE ZOOMING | | INFORMATION FOR JUDGMENT | |
|---|---|---|---|---|---|
| | | AE | AWB | IMAGE | PHOTO. INFO. |
| Background image photographed against the sun | It becomes light-colored because the background image is much brighter than the image of the person | changed | not changed | Brighter than a specified level Color balance | Position of the main subject |
| Background image photographed under different light sources | Color of the background image is not well-balanced when the flash firing photographing or slow synchronization photographing was conducted in a room illuminated by a tungsten or fluorescent light | changed | changed | Color balance | Position of the main subject Flash firing photographing |
| Image in water | Color reproduction of an image of an object in water, e.g., a fish in a water tank is poor because of a difference in index of refraction | changed | changed | Color balance | Position of the main subject |

As shown in TABLE-1, in the image photographed against the sun, the main subject image looks dark, whereas the background image look light-colored. Accordingly, it is preferable to change the exposure value although the color balance is substantially of the same level. If the image photographed under the different light sources for the background image and the main subject image, e.g., the image photographed with the assist of flash light in a room illuminated by a fluorescent light is reproduced such that the main subject image is properly reproduced and the background image looks too greenish. Accordingly, it is preferable to change both the exposure value and the white balance. Further, since the object in water takes a color different from its actual color because of a difference in index of refraction, it is preferable to change both the exposure value and the white balance.

If it is judged to be preferable to change both the exposure value and the white balance value to those calculated for the enlarged image, a light/color measuring circuit 16 reads the image data within the enlargement area which is interpolated in the interpolation circuit 14 and calculates the exposure value AEzoom and the color measurement value AWBzoom for the enlarged image. The exposure value AEzoom in the enlargement area is obtained by a complete averaging:

$$AEzoom=0.29R+0.7G+0.11B.$$

the color correction are applied in accordance with these data. The image within the enlargement area to which the luminance correction and the color correction are applied is fed to an output unit 18 which outputs the image data after converting it into a signal of format suitable to be displayed on the monitor, e.g., into an NTSC signal. The image data may be converted into color signals of cyan, magenta, yellow and black so that it can be printed by means of a color printer.

Figure 11:
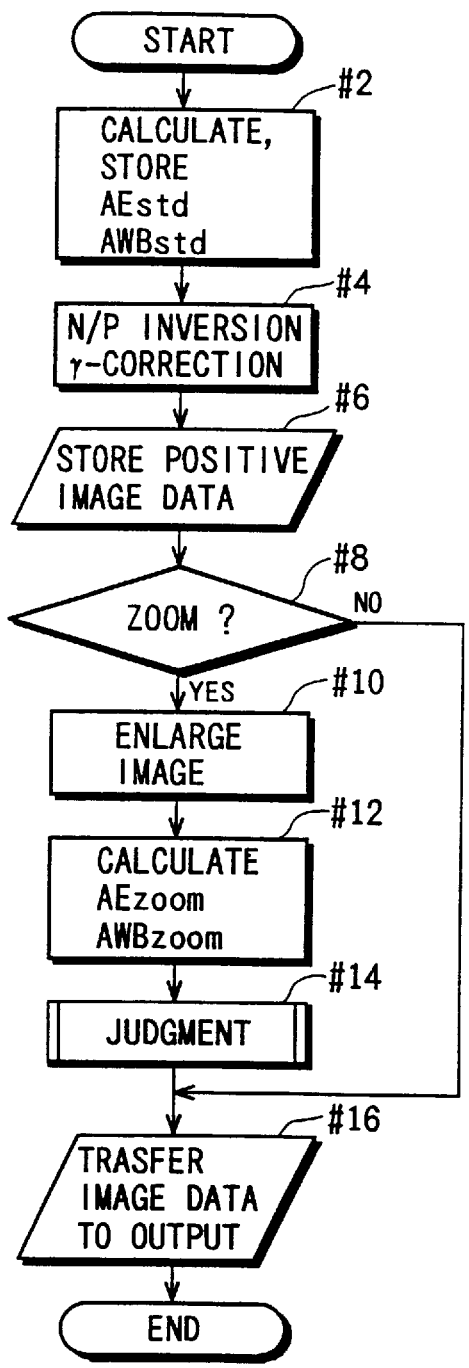
FIG. 11 is a flowchart showing a main routine of film image reproducing operation of the apparatus.

Operations performed to the picked up image will be described with reference to a flowchart shown in FIG. 11.

The film image data picked up by the image pick-up device 5 is fed to the light/color measuring circuit 9. The circuit 9 calculates the exposure value AEstd and the color measurement value AWBstd and these values are stored in the data memory 10 (Step #2). Then, the N/P inverting circuit 11 applies to the image data the N/P inversion, the white balance correction and the γ-correction for the gradation correction in accordance with the exposure value AEstd and the color measurement value AWBstd (Step #4). The obtained positive image data is stored in the image memory 12 (Step #6).

Subsequently, it is judged whether the zoom data has been input from the zoom command unit 13 (Step #8). If no zoom data has been input (NO in Step #8), the interpolation circuit 14 transfers the image data in the image memory 12 directly to the luminance/color correcting circuit 15 without applying the interpolation thereto, and the circuit 15 transfers the image data to the output unit 18 after applying the corrections in accordance with the exposure value AEstd and the color measurement value AWBstd (Step #16). If the zoom data has been input (YES in Step #8), the interpolation circuit 14 enlarges the image within the enlargement area in accordance with the zoom data (Step #10). Then, the light/color measuring circuit 16 calculates the exposure value AEzoom and the color measurement value AWBzoom for the enlarged image (Step #12). In Step #14, a subroutine "JUDGMENT" is carried out, in other words, it is judged whether it is preferable to use the exposure value AEzoom and the color measurement value AWBzoom.

Figure 12:
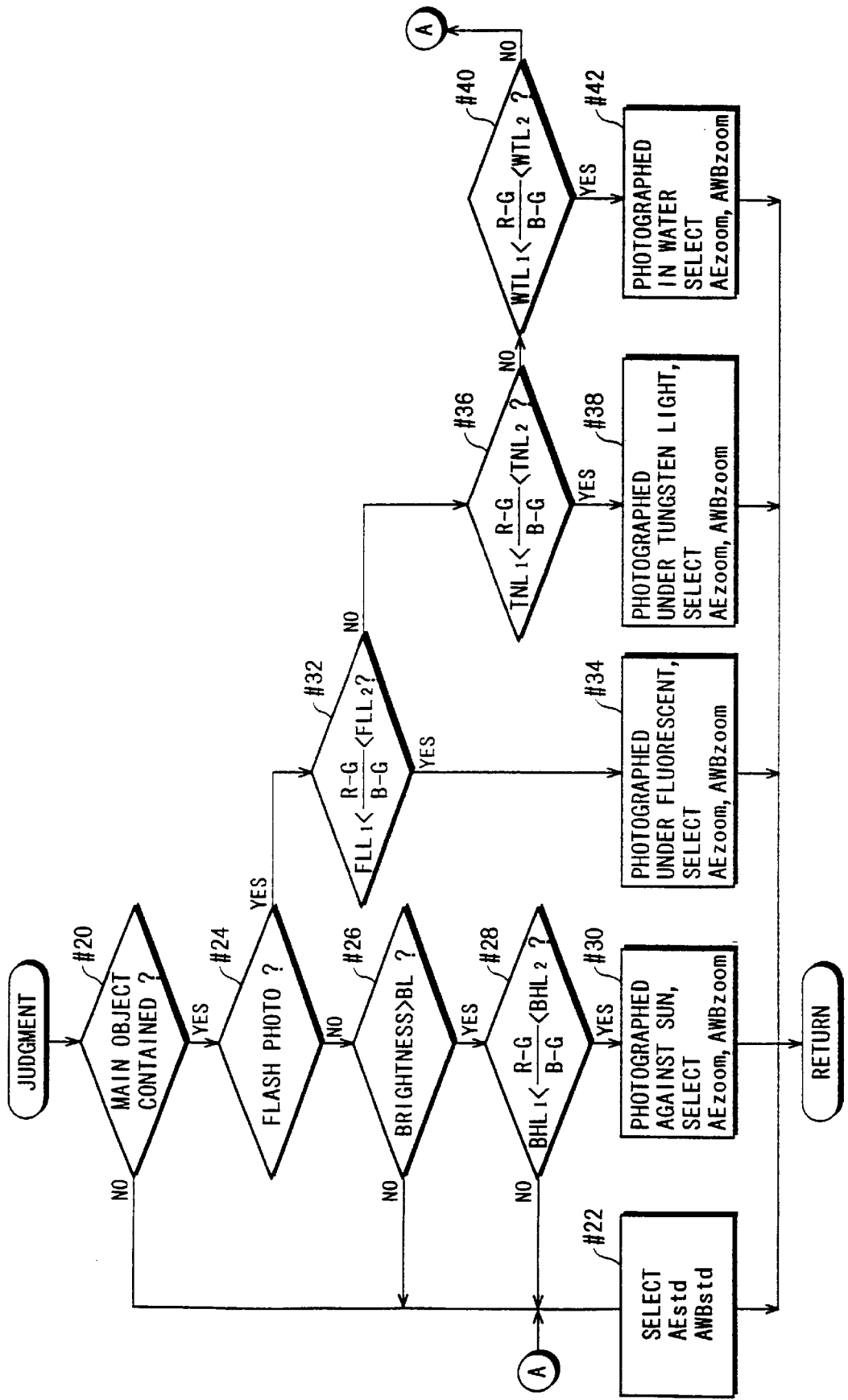
FIG. 12 is a flowchart showing a subroutine "JUDGMENT" executed in Step #14 of the main routine.

FIG. 12 shows the subroutine "JUDGMENT" carried out in Step #14.

The contents of the reference numerals used in this flowchart are as follows:

R–G B–G: Color difference signal

BL: A luminance difference between during the normal processing and during the zooming BHL1,2: Reference in estimating the color of the background image when the white balance correction is made during the normal processing FLL1,2: Reference in estimating the color of the background image under the fluorescent light when the white balance correction is made during the normal processing TNL1,2: Reference in estimating the color of the background image under the tungsten light when the white balance correction is made during the normal processing WTL1,2: Reference in estimating the color of the background image under water when the white balance correction is made during the normal processing Before describing this subroutine, a relationship between the color difference signals (R–G, B–G) and the color estimation references BHL1,2 to WTL1,2 is described with reference to FIGS. 7 to 10. In FIGS. 7 to 10, a horizontal axis represents a color difference (B–G) and a vertical axis represents a color difference (R–G).

Figure 7:
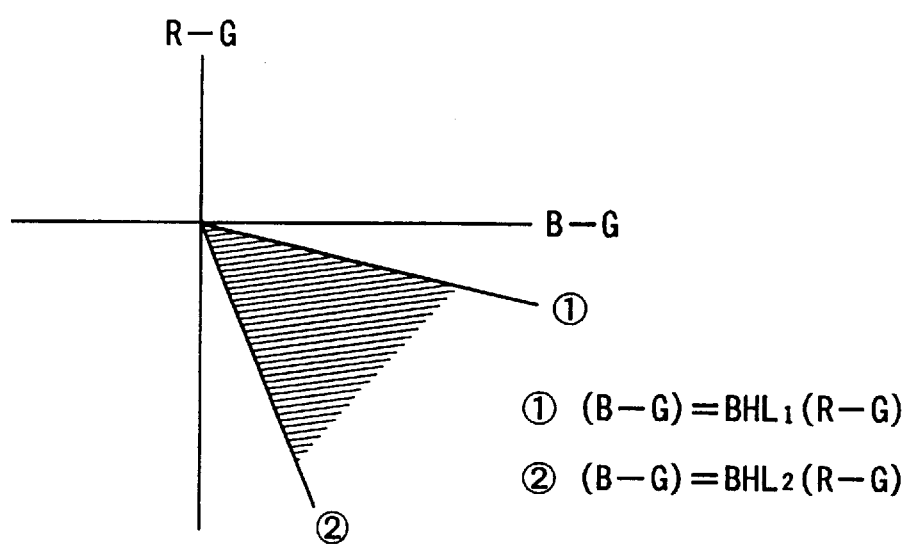
FIG. 7 is a graph showing a characteristic of a background image photographed against the sun.

FIG. 7 is a graph showing a characteristic of the background image photographed against the sun. The background was photographed against the sun if a color difference ratio (R–G)/(B–G) in the enlarged area (background image), i.e., an inclination falls within a range defined by straight lines ① and ② (black area in FIG. 7).

Figure 8:
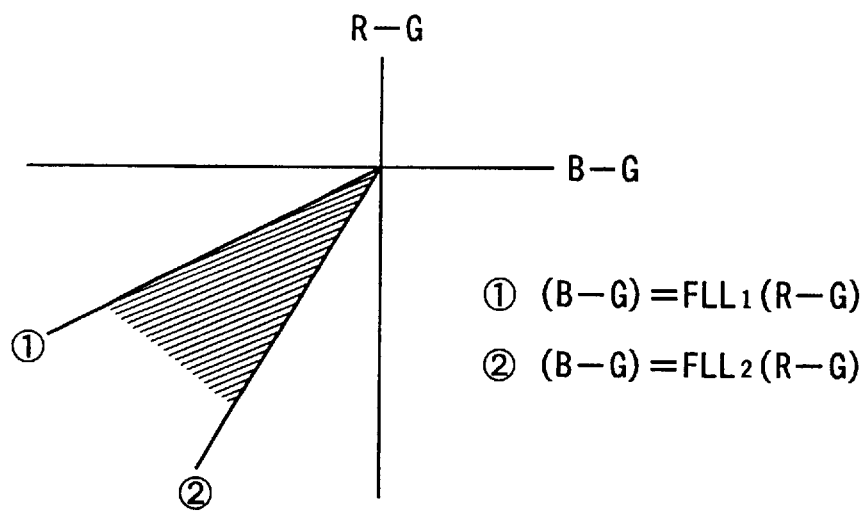
FIG. 8 is a graph showing a characteristic of a background image photographed with the assist of flash light under a fluorescent light.

FIG. 8 is a graph showing a characteristic of the background image photographed under the fluorescent light. The background image is assumed to have been photographed under the fluorescent light, if the color difference ratio (R–G)/(B–G) in the enlarged area (background image), i.e., an inclination falls within a range defined by straight lines ① and ② (black area in FIG. 8).

Figure 9:
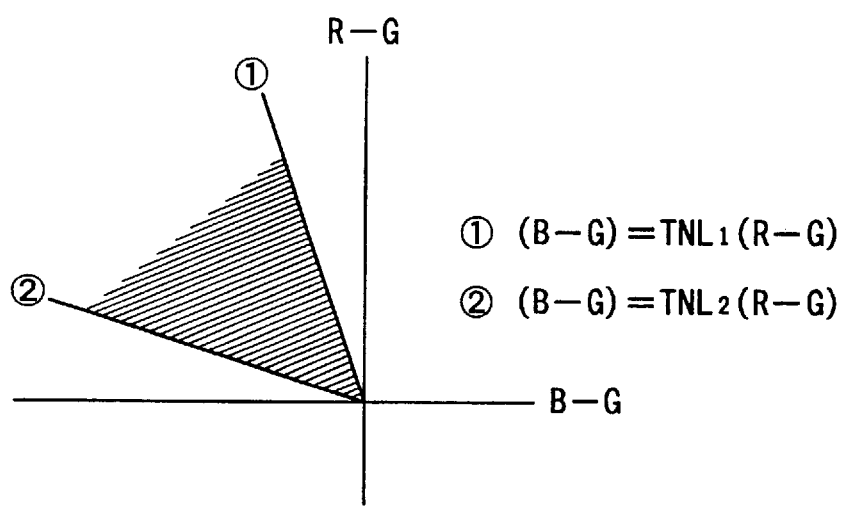
FIG. 9 is a graph showing a characteristic of a background image photographed with the assist of flash light under a tungsten light.

FIG. 9 is a graph showing a characteristic of the background photographed image under the tungsten light. The background image is assumed to have been photographed under the tungsten light, if the color difference ratio (R–G)/(B–G) in the enlarged area (background image), i.e., an inclination falls within a range defined by straight lines ① and ② (black area in FIG. 9).

Figure 10:
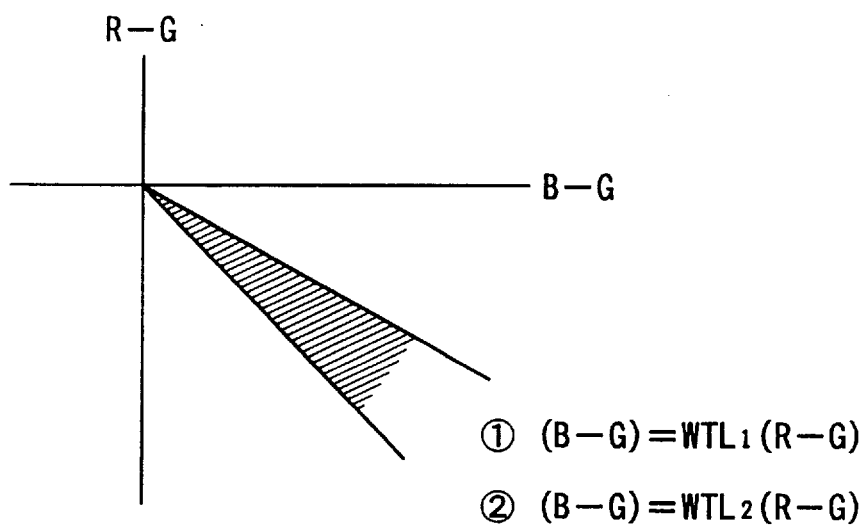
FIG. 10 is a graph showing a characteristic of a background image photographed under water.

FIG. 10 is a graph showing a characteristic of the background photographed image under water. The background image is assumed to have photographed under water, if the color difference ratio (R–G)/(B–G) in the enlarged area (background image), i.e., an inclination falls within a range defined by straight lines ① and ② (black area in FIG. 10).

In FIG. 12, it is judged based on the photographing information whether the enlargement area contains the main subject image (Step #20). If the enlargement area contains the main subject image, the exposure value AEstd and the color measurement value AWBstd for the picked up image are selected since the exposure value and the color measurement value need not be changed (Step #22). Unless the enlargement area contains the main subject image, it is judged based on the photographing information whether the flash firing photographing was conducted (Step #24). If the flash firing photographing was not conducted, it is judged whether the brightness, i.e., a difference between the luminance in the main subject image area and that in the enlargement area is in excess of BL (Step #26). If the brightness is BL or lower, the exposure value AEstd and the color measurement value AWBstd for the picked up image are selected upon the judgment that the luminance difference between in the main subject image area and in the enlargement area is small (Step #22).

On the other hand, the brightness is higher than BL, it is judged whether the enlargement area contains the background image photographed against the sun (Step #28). Specifically, this judgment is made by judging whether the color difference ratio (R–G)/(B–G) lies in a range defined between BHL1 and BHL2. If this ratio lies beyond the range defined between BHL1 and BHL2, the exposure value AEstd and the color measurement value AWBstd are selected upon the assumption that the background image was not photographed against the sun (Step #22). If this ratio lies in the range defined between BHL1 and BHL2, the exposure value AEzoom and the color measurement value AWBzoom are selected upon the assumption that the background image was photographed against the sun (Step #30).

If the flash firing photographing was conducted (YES in Step #24), it is judged whether the enlargement area contains the background image photographed under the fluorescent light. Specifically, this judgment is made by judging whether the color difference ratio (R–G)/(B–G) lies in a range defined between FLL1 and FLL2. If this ratio lies in the range defined between FLL1 and FLL2, the exposure value AEzoom and the color measurement value AWBzoom are selected upon the assumption that the background image was photographed under the fluorescent light (Step #34). If this ratio lies beyond the range defined between FLL1 and FLL2, it is judged whether the enlargement area contains the background image photographed under the tungsten light (Step #38). Specifically, this judgment is made by judging whether the color difference ratio (R–G)/(B–G) lies in a range defined between TNL1 and TNL2. If this ratio lies in the range defined between TNL1 and TNL2, the exposure value AEzoom and the color measurement value AWBzoom are selected upon the assumption that the background image was photographed under the tungsten light (Step #38). On the other hand, if the ratio lies beyond the range defined between the TNL1 and TNL2, it is judged whether the photographing was conducted in water. Specifically, this judgment is made by judging whether the color difference ratio (R–G)/(B–G) lies in a range defined between WTL1 and WTL2. If this ratio lies in the range defined between WTL1 and WTL2, the exposure value AEzoom and the color measurement value AWBzoom are selected upon the assumption that the photographing was conducted in water (Step #42). On the other hand, if the ratio lies beyond the range defined between the WTL1 and WTL2, the exposure value AEstd and the color measurement value AWBstd are selected (Step #22).

In this way, the exposure value and the color measurement value suitable for the enlarged image to be reproduced are selected in accordance with the photographing information. Since the luminance correction and the white balance correction are applied in accordance with these selected suitable values, a proper reproduced image can always be obtained regardless of whether the entire film image or an arbitrarily designated part thereof is reproduced.

If the film F is a positive film, it is sufficient to calculate the exposure value and to perform the exposure correction. In this case, it is unnecessary to calculate the color measurement value and to perform the color correction (white balance correction).

As described above, in designating and reproducing a part of a picked up film image, a photographing information of a film is read and a judgment is made based on the read photographing information whether an exposure value and a color measurement value for the picked up image or those values for the image within a reproduction area should be used. Accordingly, the image to be reproduced can be processed using the suitable exposure value and white balance correction value, and the image can always properly be reproduced regardless of whether the entire film image or an arbitrarily designated part thereof is reproduced. Particularly, even in the case where the reproduction area contains the background image for the main subject image, and the exposure value and the color measurement value therefor differ from those for the main subject image, a suitable reproduced image can be obtained.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A film image reproducing apparatus comprising:
   an image pick-up device which picks up a film frame image recorded on a film to generate image data;
   an information reader which reads information about photographing conditions of the film frame image;
   a reproducing area designator which designates an area within the film frame image, wherein only the designated area is reproduced in a subsequent reproducing process;
   a measuring device which measures a domestic light condition having to do with the designated reproducing area when the film frame image is picked up; and
   a judging processor which judges based on the information which is proper to use for generation of image data of the designated area, the domestic light condition of the designated area or an undomestic light condition that is different than the domestic light condition.

2. A film image reproducing apparatus as defined in claim 1, wherein the information is recorded on the film on which the film frame image is recorded.

3. A film image reproducing apparatus as defined in claim 1, wherein the measuring device further measures a general light condition of a whole area of the film frame image as the undomestic light condition.

4. A film image reproducing apparatus as defined in claim 1, wherein the information includes at least one of a brightness of a subject, a position of a main subject, and a light source.

5. A film image reproducing apparatus as defined in claim 1, wherein the measuring device measures a light condition based on the generated image data.

6. A film image reproducing apparatus as defined in claim 1, wherein the measuring device measures a light amount at the designated reproducing area as the light condition.

7. A film image reproducing apparatus as defined in claim 6, further comprising a correcting device which corrects the image data corresponding to the designated area in aspect of brightness of the designated area.

8. A film image reproducing apparatus as defined in claim 1, wherein the measuring device measures a color level at the designated reproducing area as the light condition.

9. A film image reproducing apparatus as defined in claim 8, further comprising a correcting device which corrects the image data corresponding to the designated area in aspect of color of the designated area.

10. A film image reproducing apparatus as defined in claim 1, wherein the measuring device measures a light amount and a color level at the designated reproducing area as the light condition.

11. A film image reproducing apparatus as defined in claim 10, further comprising a correcting device which corrects the image data corresponding to the designated area in aspect of brightness and color of the designated area.

12. A film image reproducing apparatus comprising:
    an image pick-up device which picks up a film frame image recorded on a film to generate image data;
    an information reader which reads information about photographing conditions of the film frame image;
    a reproducing area designator which designates an area to be reproduced in the picked-up film frame image, wherein only the designated area is reproduced in a subsequent reproducing process;
    a measuring device which measures a domestic light condition having to do with the designated reproducing area when the film frame image is picked up;
    a judging processor which judges based on the information which is proper to use for generation of image data of the designated area, the domestic light condition of the designated area or an undomestic light condition that is different than the domestic light condition; and
    an output unit which outputs the corrected image data corresponding to the designated reproducing area.

13. A film image reproducing apparatus as defined in claim 12, wherein the information is recorded on the film on which the film frame image is recorded.

14. A film image reproducing apparatus as defined in claim 12, wherein the measuring device further measures a general light condition of a whole area of the film frame image as the undomestic light condition.

15. A film image reproducing apparatus as defined in claim 12, wherein the information includes at least one of a brightness of a subject, a position of a main subject, and a light source.

16. A film image reproducing apparatus as defined in claim 12, wherein the measuring device measures a light condition based on the generated image data.

17. An image reproducing apparatus comprising:
    an image pick-up device which picks up an image to generate image data;
    an information detector which detects information about photographing conditions;
    a reproducing area designator which designates an area in the image, wherein only the designated area is reproduced in a subsequent reproducing process;

a measuring device which measures a domestic light condition having to do with the designated reproducing area when the image is picked up; and a judging processor which judges based on the information which is proper to use for generation of image data of the designated area, the domestic light condition of the designated area or an undomestic light condition that is different than the domestic light condition.

18. An image reproducing apparatus as defined claim 17, wherein the undomestic light condition is a general light condition of a whole area of the image.

19. An image reproducing apparatus as defined in claim 17, further comprising a corrector which corrects the image data in accordance with a judgment of the judging processor.

* * * * *